US009372927B1

(12) United States Patent  
Fredinburg et al.

(10) Patent No.: US 9,372,927 B1  
(45) Date of Patent: Jun. 21, 2016

(54) ORIGINAL AUTHORSHIP IDENTIFICATION OF ELECTRONIC PUBLICATIONS

(71) Applicant: GOOGLE INC., Mountain View, CA (US)

(72) Inventors: Dan Fredinburg, San Francisco, CA (US); Ross Graber, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 197 days.

(21) Appl. No.: 13/841,670

(22) Filed: Mar. 15, 2013

Related U.S. Application Data

(60) Provisional application No. 61/647,934, filed on May 16, 2012.

(51) Int. Cl.  
*G06F 17/30* (2006.01)

(52) U.S. Cl.  
CPC .............................. *G06F 17/30864* (2013.01)

(58) Field of Classification Search  
CPC ............ G06F 17/30749; G06F 17/30761; G06F 17/30864; G06F 17/3089; G06F 17/30882; G06F 17/30828; G06F 2221/2119; G06F 21/6263; G06F 2216/03; G06F 17/30867; G06F 17/27; G06F 17/3002; G06F 17/30899; G06F 17/2235; G06F 17/241; G06F 17/30; G06F 17/30244; G06F 17/30294; G06F 17/30442; G06F 17/30584; G06F 17/30598; G06F 17/30719; G06F 17/3087; G06F 21/55; G06F 19/3456  
USPC ................. 707/709, E17.116, 711, 728, 749, 707/E17.109, 769, 726, 776, E17.107, 707/E17.108, E17.017, 741, E17.001, 707/E17.002, E17.014, 706, 710, 713, 736, 707/756, 758, 781, 999.003, 999.005  
See application file for complete search history.

(56) References Cited

U.S. PATENT DOCUMENTS

| | | | | | |
|---|---|---|---|---|---|
| 6,094,649 | A | * | 7/2000 | Bowen et al. | 707/711 |
| 2003/0212649 | A1 | * | 11/2003 | Denesuk et al. | 707/1 |
| 2009/0248672 | A1 | * | 10/2009 | McIntire et al. | 707/5 |
| 2010/0030765 | A1 | * | 2/2010 | Chi et al. | 707/5 |
| 2010/0030813 | A1 | * | 2/2010 | Peyrichoux et al. | 707/200 |
| 2012/0095987 | A1 | * | 4/2012 | Cheng | 707/713 |
| 2013/0124596 | A1 | * | 5/2013 | Damman et al. | 709/201 |

* cited by examiner

*Primary Examiner* — Robert Beausoliel, Jr.  
*Assistant Examiner* — Pedro J Santos  
(74) *Attorney, Agent, or Firm* — Procopio, Cory, Hargreaves & Savitch LLP

(57) ABSTRACT

An example implementation includes providing original content on a content source; inserting a unique content ID into content information associated with the original content; associating the original content with an author profile; detecting a following of the hyperlinks between the original content and a second content, via a content aggregation based on communication with the content source via a web index; applying a timestamp to the original content, and providing the original content having the timestamp to the web index.

17 Claims, 9 Drawing Sheets

ORIGINAL AUTHORSHIP IDENTIFICATION OF ELECTRONIC PUBLICATIONS

CROSS-REFERENCE TO RELATED APPLICATIONS

This application is a non-provisional of U.S. Provisional Patent Application No. 61/647,934, filed May 16, 2012, the entire contents of which are incorporated herein in their entirety by reference.

BACKGROUND

1. Technical Field

Aspects of the example implementations relate to authorship identification of electronic content, and more specifically, original content provided with author identification information, and initial traffic associated with the original content being controlled by the author, and applied to associate the original content with the author.

2. Background

Electronic publications are easily distributed throughout the Internet and World Wide Web (the "Web"), allowing users to view such content from remote locations. News and/or media content can be published and republished by multiple content sources. The identity of the original source of content, such as an author, may be obscured or lost as it is distributed. Plagiarism may result from such distribution. Authors have asserted identity through keywords and metadata of site, pages and content blocks.

Authorship identity can be lost not only through electronic distribution, but may also be obscured. Many people have the same or similar names, making it difficult to ascertain the true source of published content. An author may accordingly be erroneously associated with publications originating with others as well has having his/her own work erroneously attributed to others.

SUMMARY

Example implementations, described herein relate to apparatus and methods for establishing and maintaining authorship identification information of electronic content such as content associated with the Web. An example method includes providing an original piece of content on a content source, inserting a unique content ID into content information associated with the original piece of content, associating the original piece of content with an author profile, following hyperlinks between the original piece of content and a second piece of content, detecting the following of the hyperlinks with a content aggregation system that communicates with the content source via a network including interconnected computer networks and a web index, applying a timestamp to the original piece of content, and sending the original piece of content to the web index.

An example system includes a network including interconnected computer networks, one or more content sources, and a web index. An author profile database including author information is connected to the network. A first content source is operatively associated with the network and configured to publish first content and to insert a unique content ID and the author information into content information associated with the first content, the first content source being further configured to create traffic directed to the first content. A web server operatively associated with the first content source is provided for disseminating content via the network. A content aggregator is configured to detect traffic directed to the first content, to receive content via the network including the first content from the first content source, timestamp the first content, and aggregate content including the unique content ID. A web index is operatively associated with the content aggregator.

According to another example implementation, a method is provided, comprising providing original content on a content source; inserting a unique content ID into content information associated with the original content; associating the original content with an author profile; detecting a following of the hyperlinks between the original content and a second content, via a content aggregation based on communication with the content source via a web index; applying a timestamp to the original content, and providing the original content having the timestamp to the web index.

According to yet another example implementation, a system is provided, comprising a network including interconnected computer networks, one or more content sources, and a web index; an author profile database including author information communicatively coupled to the network; a first content source operatively associated with the network and configured to publish first content and to insert a unique content ID and the author information into content information associated with the first content, the first content source being further configured to create traffic directed to the first content; a web server operatively associated with the first content source for disseminating content via the network; a content aggregator configured to detect traffic directed to the first content, to receive content via the network including the first content from the first content source, timestamp the first content, and aggregate content including the unique content ID, and a web index operatively associated with the content aggregator.

According to still another example, implementation, a non-transitory computer readable medium having executable instructions is provided, the instructions comprising providing original content on a content source; inserting a unique content ID into content information associated with the original content; associating the original content with an author profile; detecting a following of the hyperlinks between the original content and a second content, via a content aggregation based on communication with the content source via a web index; and applying a timestamp to the original content, and providing the original content having the timestamp to the web index.

As used herein, "facilitating" an action may include, but is not limited to, performing the action, making the action less burdensome, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Techniques as disclosed herein may provide substantial beneficial technical effects. For example, one or more implementations may provide one or more of the following advantages:

Prompt association of author with content;
  Facilitating authorship identification through use of pre-existing bi-directional verified link by author;
  Time stamping of content prior to web crawler browsing.

The following description of example implementations is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible implementation may not be shown in order to facilitate a less hindered view of the illustrated implementations.

DETAILED DESCRIPTION

Implementations will be described herein in the context of illustrative systems operative to obtain and distribute content. It should be understood, however, that the described implementations are not to be considered as limited to the described or any other particular arrangements. Rather, the implementations are more generally applicable to any systems that allow the electronic publication and republication of content. Moreover, it will become apparent to those skilled in the art given the teachings herein that numerous modifications can be made to the implementations shown that are within the scope of the disclosure. That is, no limitations with respect to the implementations described herein are intended or should be inferred.

Content sources that publish on the Internet, such as media outlets, online news and magazine outlets, blogs, and others generate millions of articles that are collectively called media content or "content." After content is published by an original content source such as an original author, it may be republished by multiple content sources and website providers across the global system of interconnected computers known as the Internet. When content sources republish the content, individuals are able to obtain the content by accessing one or more of the content sources. For example, using a web browser, individuals are able to access the system of interlinked hypertext documents comprising the Web via the Internet to obtain web pages containing text, images and/or videos. As the content is republished by multiple content sources, a greater number of individuals are able to gain access to the content. Content authors may be individuals or entities depending on how published works are created. "Authors" as the term is used herein may further comprise persons or entities that obtain ownership rights to content by assignment or other means.

Regardless of how rights are obtained, authors may have an interest in seeing that they obtain attribution for original work and that content they create is not plagiarized or erroneously credited to others. Conversely, authors and other persons and entities have an interest in ensuring that content originating with others is not erroneously attributed to them.

Figure 1:
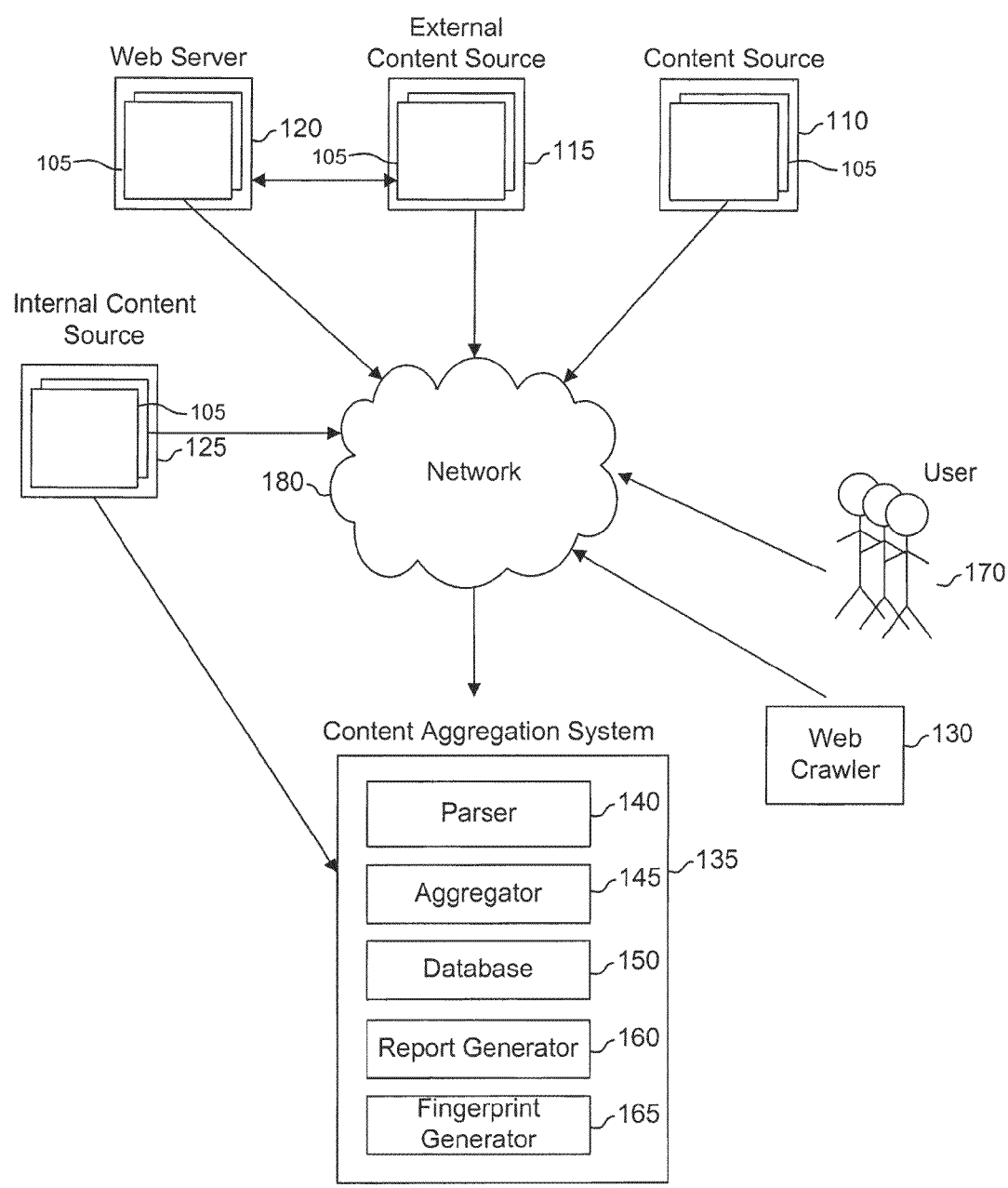
FIG. 1 shows an example system environment for content dissemination and measuring.

FIG. 1 shows a block diagram of an example system environment 100 for content dissemination and measuring. The operating environment 100 shown in FIG. 1 includes various content sources, namely a generic content source 110, an external content source 115, a web server 120, an internal content source 125, a web crawler 130, a content aggregation system 135, users such as persons 170, and a network 180. Content 105 is present in the generic content source, the external content source, the internal content source and the web server in this illustrative implementation.

The generic content source 110 may be an original content source, and/or receive content from another content source, and republish the received content. In either case, the generic content source 110 disseminates content 105 via the network 180. The generic content source 110 may first send content to the web server 120 to deliver content in the form of web pages to individuals or other content sources. The web server 120 may, for example, use Hypertext Transfer Protocol (http) to deliver content over the Internet. The generic content source 110 and web server 120 may comprise a single structure or separate servers that communicate with each other via an internal or external network.

The external content source 115 is a content source that is external to a provider that hosts the content aggregation system 135. The external content source may further comprise a web server.

The internal content source 125 is a content source that is internal to a provider that hosts the content aggregation system 135. In the example implementation, the internal content source 125 receives content 105 from one or more content sources or web servers via the network 180. Content received by the internal content source 125 is provided to the content aggregation system 135.

Each content source 110 publishes, disseminates, and/or republishes content 105. The content may be media content such as news, magazine or current events web articles. In this example implementation, the content information associated with the content includes a unique content identifier ("unique content ID"). The original source of the content provides the unique content ID which is inserted into the content. The unique content ID may be included in the content information that is provided as metadata. The unique content ID identifies content 105 as it is republished by multiple content sources. The unique content ID remains with the content during its lifetime. Each time a content source republishes content 105, the unique content ID does not change.

One or more of the content sources may disseminate content 105 by means of a news feed using the NewsML 1.2 standard. This standard is an XML-based standard designed to provide a structural framework for multimedia news. NewsML-G2 is an XML multimedia news exchange format standard of the IPTC, the International Press Telecommunications Council.

Content information may include the content delivery date, content source identification, body and title of content, AUTHOR ID and the unique content ID. The XML-based elements of the NewsML feed contain metadata that includes content information. For example, NewsML may describe a portion of the content information as:

/NewsML/NewsItem: item that represents the document.
/Identification/NewsIdentifier: uniquely identifies the news item.
/ProviderId: news wire agency identification (e.g. 'provider.com').
/DateId: creation date.
/NewsItemId: identifies an article, should stay constant through revisions. /RevisionId: version number, starts at 1.
/PublicIdentifier: global unique identifier of the document.
/AuthorId: author identification (can be generalized to include, e.g. LDAP, email, account ID)

The unique content ID and author ID may be stored in the /NewsItemId and /PublicIdentifier Tags of the NewsML standard. In another implementation, the /PublicIdentifer Tag follows the URN format such as:

"urn: newsml: ProviderId: NewsItemId: RevisionId"

In an implementation, the content information for content 105 is structured in the NITF 3.4 standard. A person skilled in the art will appreciate that the NITF standard is designed to structure news and news-like content. Content sources 110 are operable to combine the NITF standard with the NewsML standard to disseminate content 105. For example, content 105 below may be described in the NewsML and NITF standards as demonstrated below:

<NewsIdentifier>
<ProviderId>provider.com</ProviderId>
<DateId>20020715</DateId>
<NewsItemId>020715214600.i3o0xsOx</NewsItemId>
<RevisionId PreviousRevision="0" Update="N">1</RevisionId>
<PublicIdentifier>urn: newsml:afp.com:20020715: 020715214600.i
300xsOx:1</PublicIdentifier>
</NewsIdentifier>

Operating environment 100 also includes network 180. In an implementation, network 180 is an interconnected system of computer networks, such as the Internet, connected via TCP/IP. Network 180 may include multiple public and private networks that are linked by telephonic or optical technologies. In another implementation, network 180 is a local network comprised of internal content sources 125 and content aggregation system 135.

Web crawler 130 is a computer module or system of modules that browses or "crawls" the Internet in an automated and methodical manner, retrieves pages on the web and provides them to an indexer. Web crawler 130 begins its "crawl" from a list of identifiable URLs or a URL list. When web crawler 130 visits links in the URL list, web crawler 130 identifies hyperlinks in the visited URLs and adds those hyperlinks to the URL list. Web crawler 130 continuously visits the URLs in the URL list and is able to identify new or revised content 105. A person skilled in the art will appreciate that web crawler 130 is operable to identify up-to-date content 105 disseminated by content sources 110. After web crawler 130 identifies relevant content 105, content 105 is transmitted to content aggregation system 135. In an implementation, content 105 is a relevant content when content 105 is published, republished or updated by content source 110. The web crawler 130 may be housed as part of the computer aggregation system 135 or on separate computer server(s).

Content aggregation system 135 receives, stores and analyzes content 105 that it receives from content sources 110. Content aggregation system 135 receives content 105 that was identified by web crawler 130. Content aggregation system 135 includes a parser 140, a content aggregator 145, a database 150, a report generator 160, and a fingerprint generator 165. After content aggregation system 135 receives content 105, content aggregation system 135 parsers, stores and analyzes the aggregated content.

Parser 140 is operable to parse content 105 and retrieve the associated content information and the unique content ID. After parser 140 retrieves the content information, content aggregation system 135 passes the content information to content aggregator 145. In an implementation, parser 140 is operable to parse content information transmitted as metadata via NewsML and NITF standards.

Content aggregator 145 aggregates content information from content 105 with content information from other instances of content 105 received from multiple content sources 110. Content aggregator 145 is operable to use the unique content ID to identify identical content 105 that was published and republished by content sources 110. In a non-limiting implementation, content aggregator 145 may aggregate content information by content source 110 that originally published content 105. In another implementation, content aggregator 145 may also aggregate content sources 110 that republished content 105, the time that content 105 was republished, the key words that are included in content 105, and other content information that may be included in the metadata associated with content 105. In another example implementation, content aggregator 145 may aggregate content 105 by viewership in a geographic area.

Database 150 is operable to store content information from content 105. Database 150 stores content 105 using the unique content ID. In an implementation, database 150 is operable to store content information after parsing by parser 140. In another implementation content aggregation system 135 stores content information after aggregation by content aggregator 145.

Report generator 160 generates a report based on the content information stored in the database 150. In an implementation, report generator 160 generates a report based on the criteria supplied by user 170. In an implementation, user 170 may be internal to the provider that hosts content aggregation system 135. In yet another implementation, user 170 may be external to the provider and request the content report using network 180. In another implementation, the provider requires the user 170 to subscribe to the content aggregation system 135 prior to being granted access to the content report.

Because database 150 stores content information for content 105 using a unique content ID, report generator 160 is operable to generate a report that keeps a record of content 105 as it is published and republished by the content sources. The report generator may determine the number of content sources that republished content, and also determine how quickly content sources have republished content after publication by the original content source. The report generator may determine the number of individuals 170 that have accessed content 105 from a particular content source 110, from all content sources 110 or in a particular geographic area. In another implementation, report generator 160 is operable to determine whether an external event increased the viewership of content 105.

In an implementation, content aggregation system 135 includes a fingerprint generator 165. Fingerprint generator 165 is operable to generate a content fingerprint of content 105. A person skilled in the art will appreciate that the content fingerprint may be used to identify and analyze content 105 in content aggregation system 135.

Fingerprint generator 165 is operable to generate the content fingerprint using different attributes associated with content 105. In an implementation, fingerprint generator 165 may use the content information included in the metadata to generate the content fingerprint. In another implementation, fingerprint generator 165 may use part or all of the text associated with content 105 to generate the content fingerprint. In yet another implementation, fingerprint generator 165 may use the combination of attributes described herein to generate the content fingerprint. A person skilled in the art will appreciate that the implementations herein were given by way of example and not limitation and that fingerprint generator 165 may use other ways to generate the content fingerprint.

Content Aggregation

Figure 2:
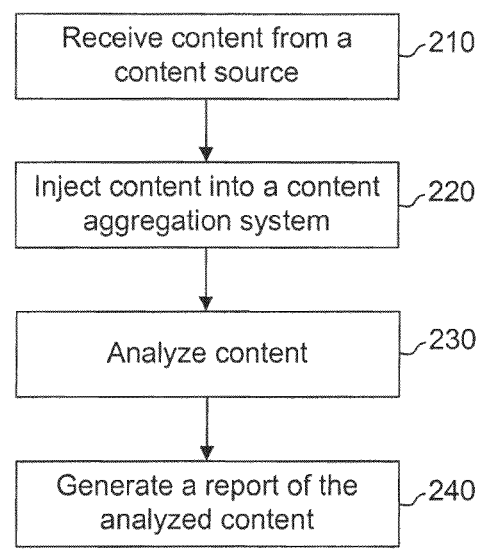
FIG. 2 is a flowchart of a high level overview of an example content aggregation system.

FIG. 2 is a flowchart illustrating an example implementation 200 of content aggregation system 135 aggregating and analyzing content 105 across the Internet. At operation 210, content aggregation system 135 receives content 105 from content sources 110. Content aggregation system 135 receives content 105 that web crawler 130 identified as relevant content. In an implementation, content 105 may be relevant content when content 105 was published by content source 110 and/or republished by content sources 110. At operation 220, content 105 is introduced into the content aggregation system 135.

Figure 3:
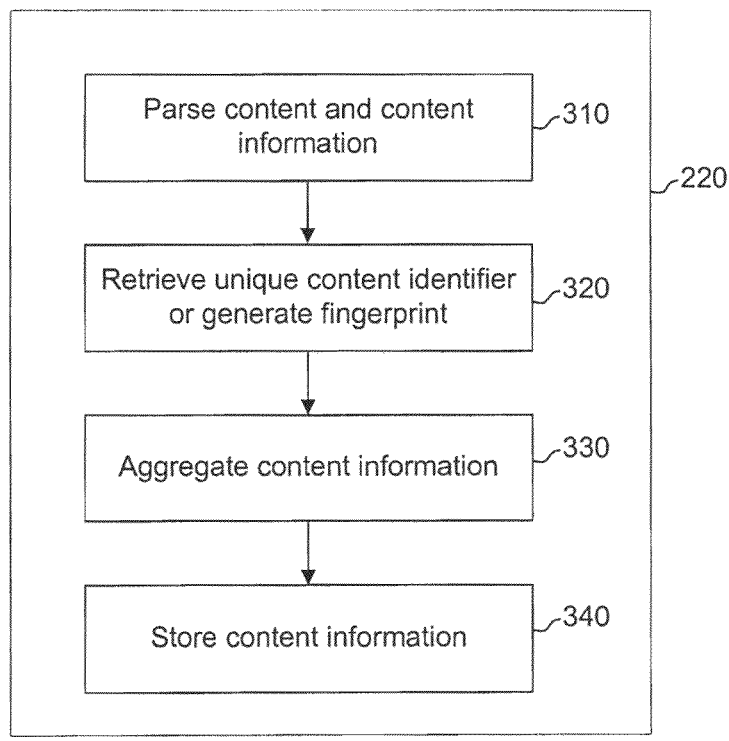
FIG. 3 is a flowchart illustrating a sequence of functions performed by the example content aggregation system.

FIG. 3 is a flowchart illustrating an example implementation 300 of the content injection process 220. At operation 310, content aggregation system 135 passes content 105 to parser 140. Parser 140 retrieves content information associated with content 105. In an implementation, content information is included in the metadata associated with content 105. In another implementation, content 105 and the associated metadata are received via a NewsML and NITF data feed format. After parser 140 parses content 105, the flowchart proceeds to operation 320. Unlike conventional media content, content 105 includes a unique content ID. This can be, for example, the id code for a website statistics service account that is inserted into html on the subscriber's website.

Figure 4:
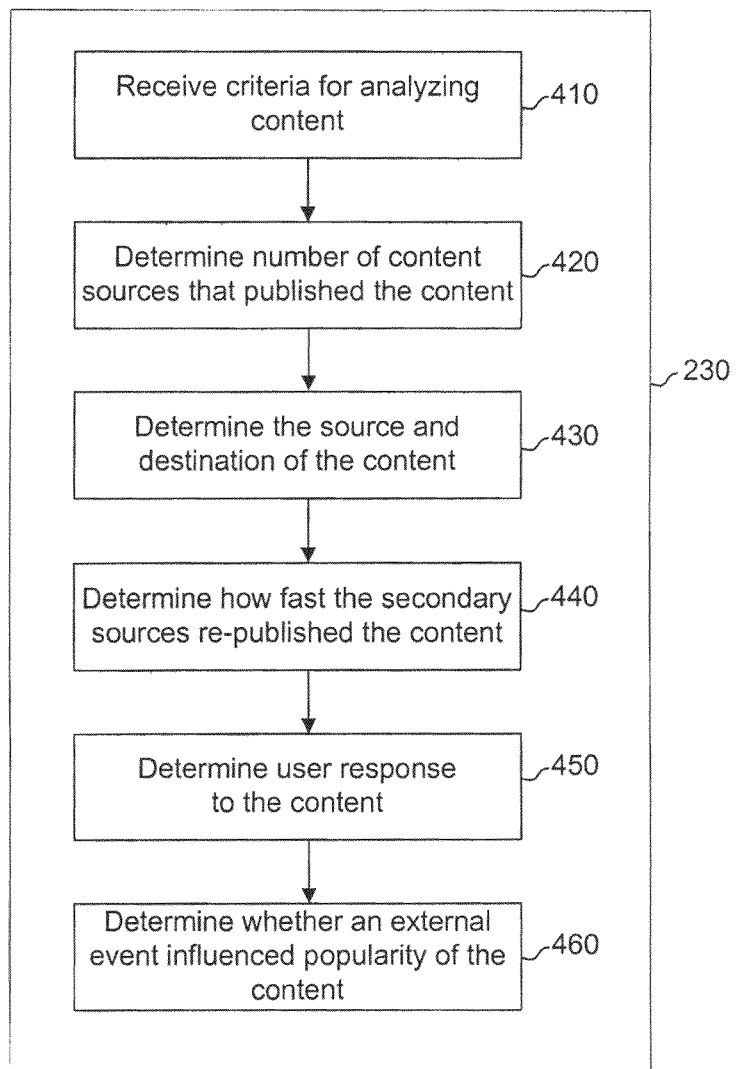
FIG. 4 is a flowchart illustrating analysis of content by the example content aggregation system based on criteria provided by a user.

The operation of the website statistics account is generally described with respect to FIGS. 2-4. Generally, the website statistics account may generate detailed statistics about a website's traffic and traffic sources, and may measures commercial activity. For example, the website statistics account may measure or analyze visitors from search engines and social networks, direct visits and referring sites. It may also displays advertising, pay-per-click networks, e-mail marketing and links within content document.

At operation 320, content aggregation system 135 retrieves the unique content ID from content 105. A person skilled in the art will appreciate that operation 320 may be performed separately or in conjunction with operation 310.

In another implementation, content aggregation system 135 uses the fingerprint generator to generate the content fingerprint for content 105. As described herein, the content aggregation system 135 is operable to use the content fingerprint to identify and aggregate content 105.

At operation 330, content aggregation system 135 passes the parsed content 105 and the unique content ID to content aggregator 145. Content aggregator 145 aggregates parsed content 105 by the unique content ID. In another implementation, content aggregator 145 aggregates the identical content 105 received from multiple content sources 110. A person skilled in the art will appreciate that content 105 may be aggregated in many ways based on the unique content ID and other content information included in content 105. At operation 340, content 105 is saved in database 150. In an implementation, content 105 may be saved in database 150 prior to and/or after operation 340.

Content Analysis

Referring to FIG. 2 at operation 230, content aggregation system 135 measures and analyses content 105. Content aggregation system 135 retrieves content 105 stored in database 150, analyzes content 105 according to a criteria defined by user 170, and generates a content report.

FIG. 4 is a flowchart illustrating an example implementation 400 of content aggregation system 135 analyzing aggregated content 105. At operation 410, content aggregation system 135 receives criteria for analyzing content 105. In an implementation, user 170 sends the criteria to content aggregation system 135. Based on the user criteria, content aggregation system 135 analyzes content 105. In an implementation, user 170 may be an authorized user who subscribes to a provider that hosts content aggregation system 135. In another implementation, user 170 may use content aggregation system 135 via a local network. In yet another implementation, user 170 may use the Internet to access content aggregation system 135.

In another implementation, a software module is inserted into content aggregation system 135. The software module is pre-programmed with criteria for analyzing content 105.

Operations 420-460 are non limiting implementations of the user criteria used to analyze content 105. A person skilled in the art will appreciate that operations 420-460 may be performed out of order or in conjunction with each other. At each operation 420-460 content aggregation system 135 retrieves and analyzes content 105 from database 150 and passes content 105 to report generator 160.

In an implementation, content sources 110 may be separated into content sources that are internal to the provider hosting content aggregation system 135, such as content source 125. In another implementation, content sources 110 are external to the provider hosting content aggregation system 135, such as content sources 115. Operations 420-460 may be performed using all content sources 110, internal content sources 125 or external content sources 115.

At operation 420, content aggregation system 135 uses the unique content ID to determine the total number of content sources 110 that have published and republished content 105. At operation 430, content aggregation system 135 uses the unique content ID to identify the original content source 110. In another implementation, content aggregation system 135 uses the unique content ID to determine the content sources 110 that have republished content 105. Because the unique content ID remains constant during the lifetime of content 105, content aggregation system 135 matches the unique content ID to content sources 110 that originally published and republished content 105. At operation 440, content aggregation system 135 uses the unique content ID to determine how quickly content sources 110 republished content 135.

For example, after original content source 110 has published content 105, multiple content sources 110 may republish content 105 in a matter of minutes, hours, days and weeks. When web crawler 130 continuously retrieves content 105 from content sources 110, content aggregation system 135 is operable to identify how quickly content 105 had spread across the Internet. At operation 450, content aggregation system 135 is operable to use the unique content ID to determine the viewership of content 105. For example, content aggregation system 135 is operable to determine the number of users 170 that viewed content at a particular content source 110, at original content source 110, at content sources 110 that have republished content 105, at internal content sources 125 and at external content sources 115. In an implementation, content aggregation system 135 is operable to compare similar contents 105 and determine the key words that tend to increase the viewership of content 105. In another implementation, content aggregation system 135 is operable to determine the viewership of the content 105 in a particular geographic area.

At operation 460, content aggregation system 135 is operable to use the unique content ID to determine if an external event increased the viewership of content 105 by comparing the viewership before and after the occurrence of an external event.

Referring again to FIG. 2, after content aggregation system 135 analyzes the content 105 in operation 230, in operation 240, report generator 160 uses the results to generate a report. In an implementation, a report may be in a graph or a table format. In another implementation, the report may be displayed to user 170 as a web page. In another implementation, the report may be available only to subscribed users 170. In yet another implementation, the report may be generated only to users 170 who are associated with the provider hosting content aggregation system 135.

The website statistics technology discussed above may be employed by many website owners operating in environments 100. The technology allows basic website record-keeping as well as customized record-keeping relating to any web page or web application that can execute JavaScript through use of a code. Users of the website statistics technology have an ID code which they can optionally insert into HTML on their website which will reference back so that the website statistics technology can collect information relating to the website. An administrator is required to insert the ID code. Such a code could also be used in a manner that proves that a certain person or entity created certain content or otherwise controls the content. This information is correlated with the first time the new content appears in an index. For example, when a block of new text is first detected, it could be hashed and then stored with the author's profile (e.g., a profile stored in a social media account). This would allow its identification any time it has been copied in the future. Content ID could foreseeably be embedded into the social media account or other post with indication of AUTHOR ID as part of it (e.g., CONTENT 12345 from AUTHOR 1234). The author is known separately from the content.

As compared to a web crawler, such as the web crawler 130 described above, the website statistics system provides real time updates. In contrast, the web crawler takes time, sometimes days or weeks, to go through the web and identify new content. While a web page may be associated with a unique content ID as discussed above, it does not necessarily follow that the content on the page belongs to the ID. The identity of who first posted the content and when the content was first posted is obtained and stays with the content regardless of how many times it is published and republished. A name or icon from an author's profile account may, for example, be caused to appear in association with content when search results are displayed.

Figure 5A:
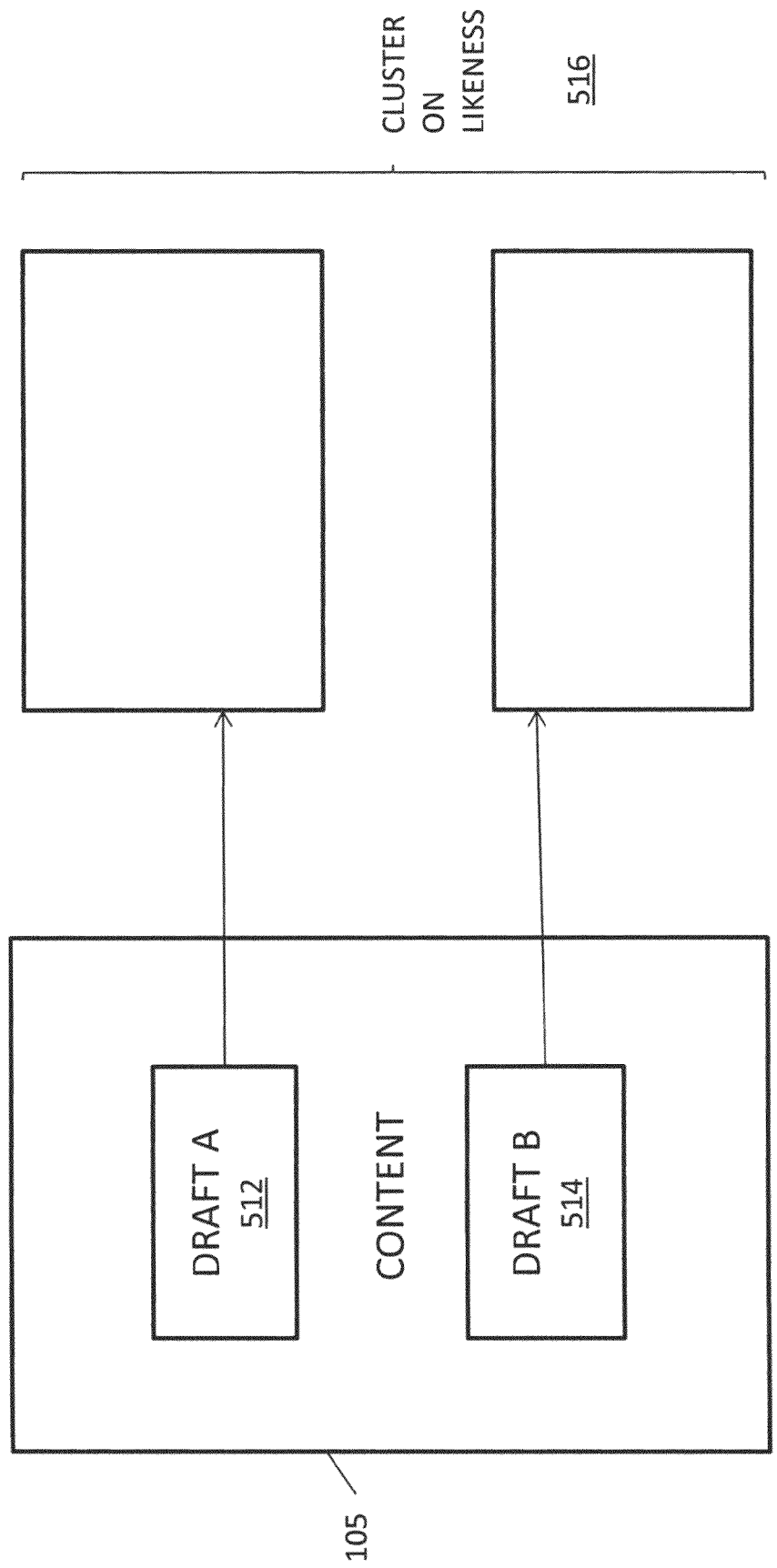
FIG. 5A is block diagram showing two linked pieces of content and transmission of the content for clustering, according to an example implementation.

A blogger or a user having a website and operating within the environment 100 may have a unique content ID, referred to as an account ID for the website statistics provider, if the user is employing the website statistics technology and possibly measuring traffic for the site. Referring to FIG. 5A, an author has created content 105 including Draft A 512. For CMS (content management system) systems, a draft to publish model may exist, but this depends on the publishing site. The social media account may provide logging. The content page Draft A has referrer links and outbound links. When those links are followed, the website statistics technology collects records of such activity. The links in this example implementation are hyperlinks. The author then makes a second draft, shown as Draft B 514 in FIG. 5A, having a link going back to Draft A. The second draft will have no records of traffic on or leaving that page.

The author creates an inbound link from an unpublished draft page (Draft A), visible only to the author to content B and back out to the same unpublished draft page. The author follows the link using ordinary hyperlinks. The website statistics technology captures this activity and timestamps it. This proves that the content was created by the author. The date stamped content goes to a clustering engine and then a web index. Here the content itself is marked and sorted in a variety of ways that will make it identifiable. The web index server is responsive to queries received via web servers and causes stored documents to be retrieved from document servers (not shown).

Figure 5B:
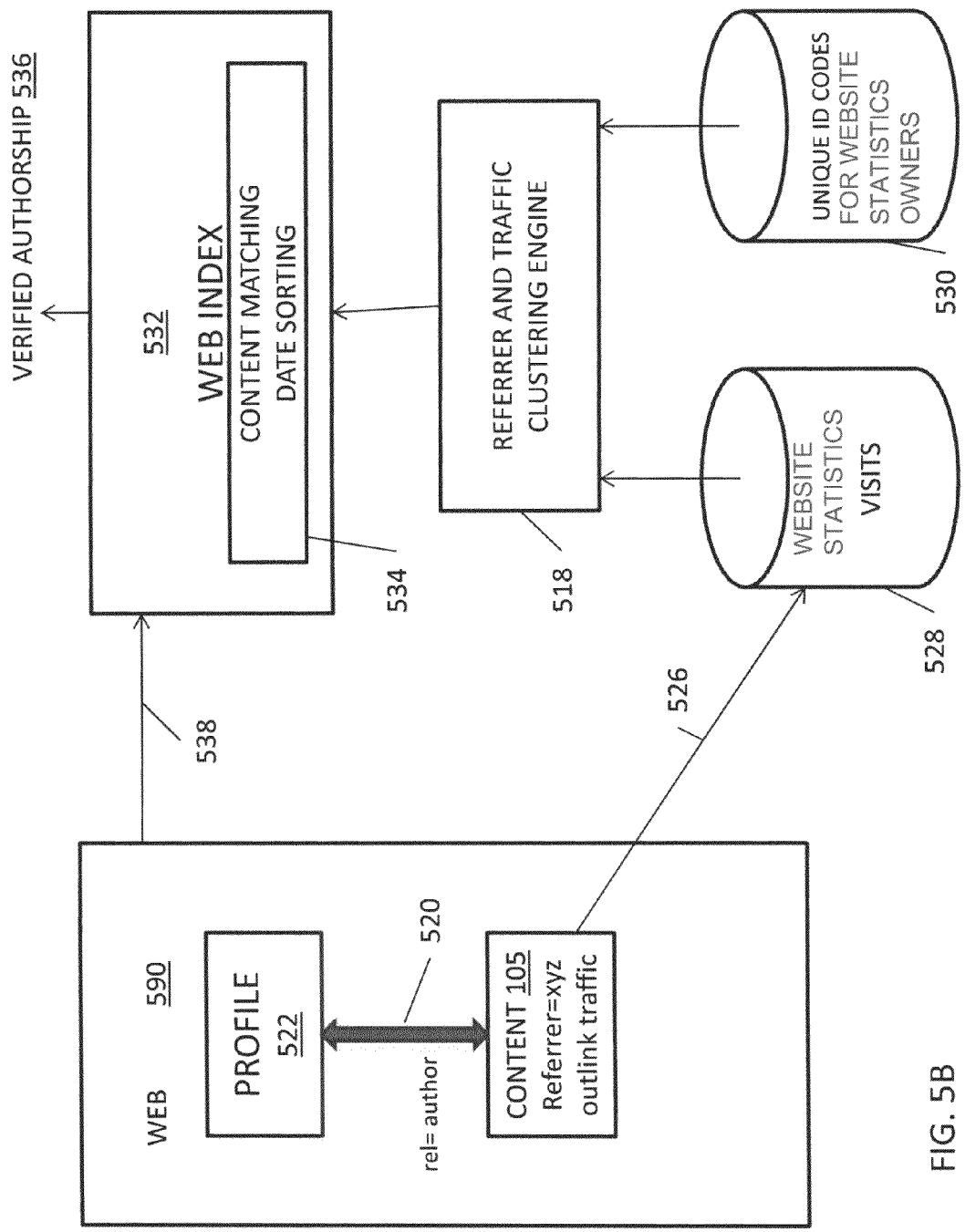
FIG. 5B is a block diagram showing a system for tying content to an author and the passage of the content to a web index, according to an example implementation.

FIG. 5B diagrammatically illustrates the mechanisms involved in associating an author with content through the use of an electronically stored profile. An author's profile 522 and content 105 are bi-directionally linked as shown by a double arrow 520, establishing the relationship of the author (rel=author) identified in the profile to the content. The profile 522 can be, for example, a social media account and/or other electronic profile(s) created by or on behalf of the author. (Content 105 is the same in both FIG. 5A and FIG. 5B.) The unique ID code is embedded at the content source prior to detection by the website statistics technology and the unique ID is the account ID for the website statistics account in this example. The author optionally selects which information from his profile should be included in the content as metadata. The content 105 can be, for example, a blog hosted on "Word-Press dot com" wherein space_dot_space is used rather than "." to avoid inclusion of browser-executable code. Both the profile and content are associated with the Web 590.

The notation "Referrer=xyz outlink traffic" relates to signals that are created and collected by the website statistics account to determine who first posted the content and when it was posted, as discussed with reference to FIG. 5A. The author, who is the only person having access to the link, follows the link, which results in a communication designated by arrow 526 to Website Statistics Visits 528. Unique ID codes 530 are assigned to users of website statistics and are stored electronically in computer readable code. The ID codes may be a user's account number or other identifier. There are accordingly two pieces of information to be further processed, namely the piece of content communicated for the first time to website statistics via a hidden link accessible to only the author or his agent(s) and the unique ID code which is embedded in the meta tags on that author's blog on every page. Both pieces of information are fed into the Referrer and Traffic Clustering Engine 518, which in turn feeds into the web index 532 with a component 534 for content matching and date sorting. This is where the date stamp occurs within the web index 532, resulting in verified authorship 536.

The Referrer and Traffic Clustering Engine 518 is a distinct module that is part of the verification system. It groups together all instances of the same piece of content which allows for the referring chain to be constructed, allowing the identities of the original poster of the content and the person who just copied it to be ascertained.

The web crawler 130, shown in FIG. 1 but not in FIG. 5B, follows all links and discovers new parts of the web as discussed in detail above. The web crawler feeds that information into the web index 532, which stores web pages. The web index is sorted based on keywords, facilitating access to documents that contain user query terms. The web index is accordingly created in part through operation of the crawler. Arrow 538 indicates that the crawler will eventually locate the content 105 and provide it to the web index, but this takes time as a page may or may not be revisited very frequently.

When a search is conducted via a web server, index servers identify which pages contain words that match query terms selected by a user. Search results are generated and displayed to the user. In the event the search results include content 105 that has been processed as described above with reference to FIGS. 5A and 5B, the author's name, an icon representing the author, and/or a link to the author's profile will appear on the display in association with the content. The correct and original author will accordingly be identified whether the retrieved content is original or republished.

Figure 7A:
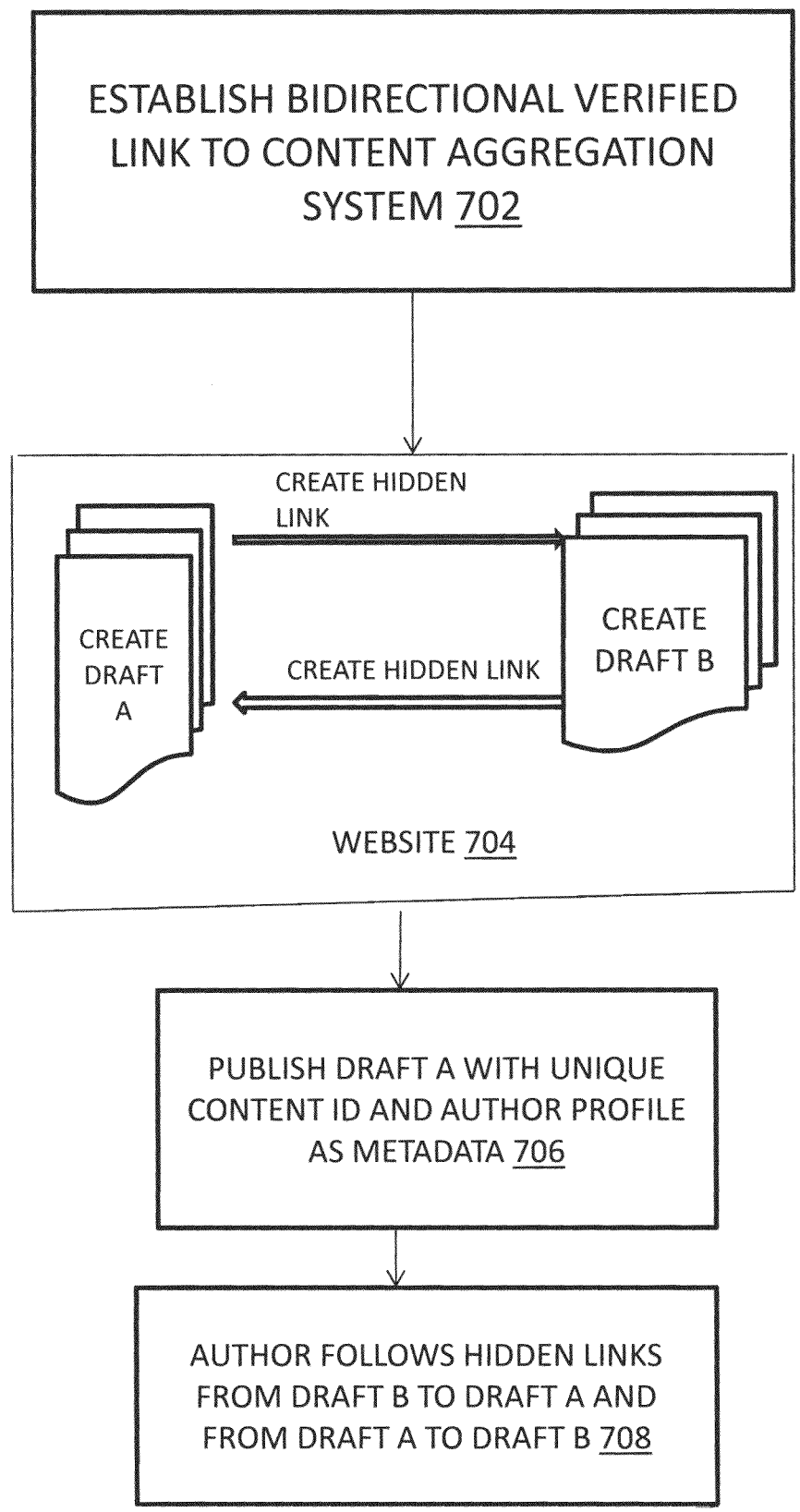
FIGS. 7A-B show a flowchart illustrating the processing of content including author identification.
Figure 7B:
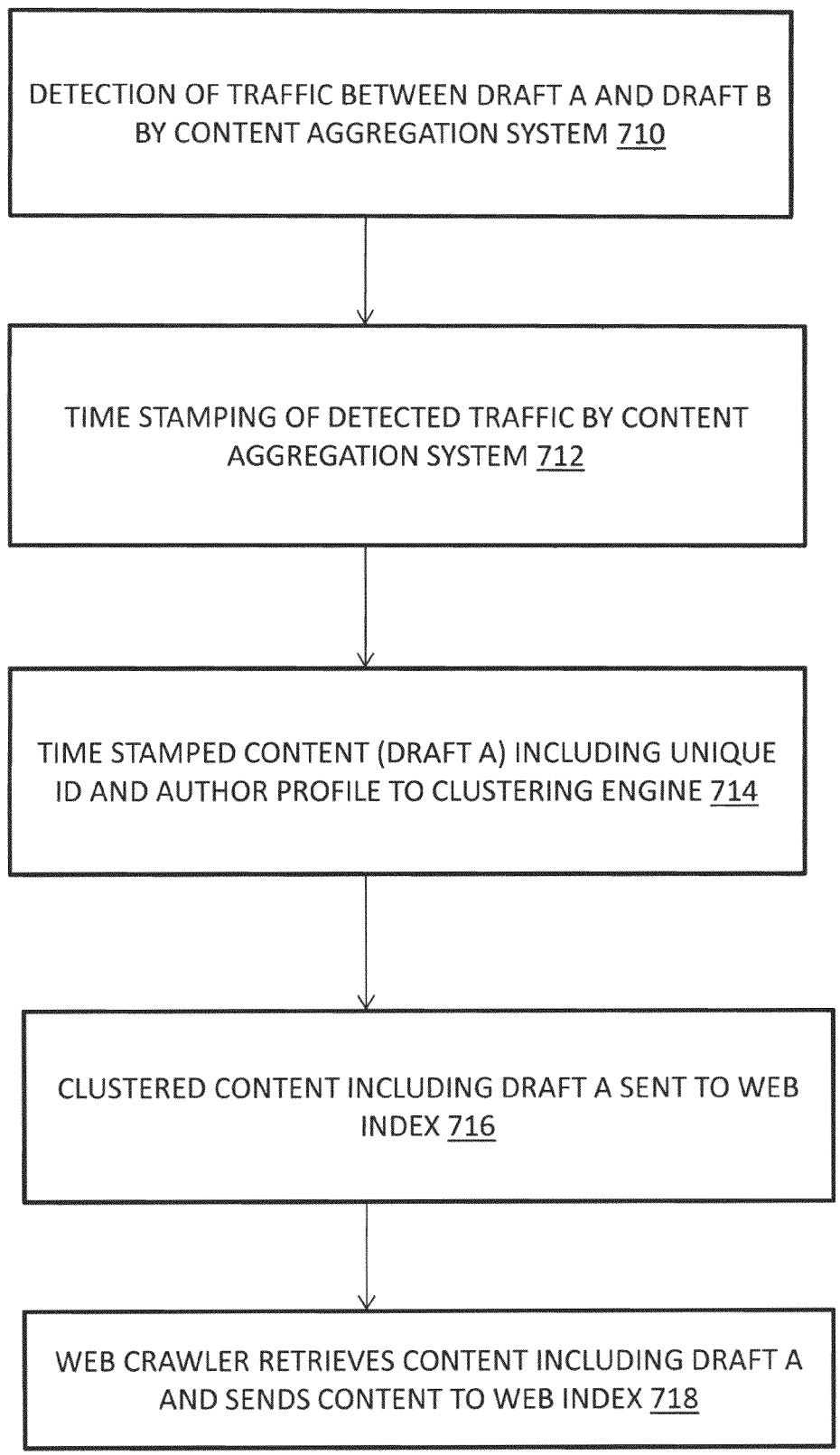

FIGS. 7A AND 7B show a sequence of operations that may be followed in accordance with an example implementation. The first operation 702 is for a webmaster, blogger or other person or entity with access to the Internet to establish a bidirectional verified link to a content aggregation system. A web server that provides content in the form of web pages to the content aggregation system may be employed. Once such a link is established, protection of subsequently created content is facilitated. Access to the content aggregation system is may be optionally restricted to authorized persons or entities. Unauthorized persons and entities accordingly should not be able to readily gain access to the content sent to the content aggregation system until it is processed later by the web index 532. Communications received from the content aggregation system are likewise restricted. As discussed above, the content provided to the content aggregation system includes a unique ID that remains with the content as it is published and republished.

In operation 704, Draft A, which may include text and/or pictorial subject matter and/or video, is created and provided with the unique ID as metadata. Draft A is further linked through the Web to the author's profile, which is also included in whole or part in Draft A. Draft B is created and optionally "hidden" links unobservable to third parties are established between Draft A and Draft B. The author follows the links (conventional hyperlinks) between Drafts A and B, at operation 708. The content aggregation system is linked to Draft A and configured to detect traffic associated with Draft A, at operation 710. The presence of the unique ID facilitates such detection. Accordingly, once the links between Drafts A and B are followed, the content aggregation system detects such traffic and applies a timestamp as at operation 712. Because Drafts A and B were not previously accessible to third parties, the earliest timestamp relating to Draft A is due to traffic created by the author rather than such third parties.

There is accordingly little or no opportunity for an outsider to appropriate the information in Draft A before it is permanently associated with the author. Timestamps are used to prove original authorship. If an author "A" has a draft with the earliest time stamp, authorship can be attributed to him. The timestamped content including the unique ID and author information are provided to a clustering engine, at operation 714. Clustered content, including Draft A, is then provided to the web index, at operation 716. Draft A, once provided to the web index, is available from document servers associated with the web index.

Once Draft A is published on the author's website or blog, as at operation 706, it becomes accessible to the web crawler, at operation 718, as well as to third parties who access the site. Draft A may then be republished in whole or part. The unique ID in the metadata allows the author to measure a status of Draft A through the operation of the content aggregation system. Because author identification information also stays with Draft A, persons accessing Draft A are able to determine the correct author whether it is obtained from the original content source or republished by another content source. In an optional implementation, the author's name or an icon will appear on a search report obtained from a user query. For example, author identification information may be pulled from a directory or repository maintained by the social media account provider. The name or icon can be linked to the author's profile on the Web.

Creating an original piece of content is one non-limiting specific example of providing an original piece of content. Other forms of content creation may substituted therefor, or used in parallel therewith, consistent with the example implementations described herein.

Figure 6:
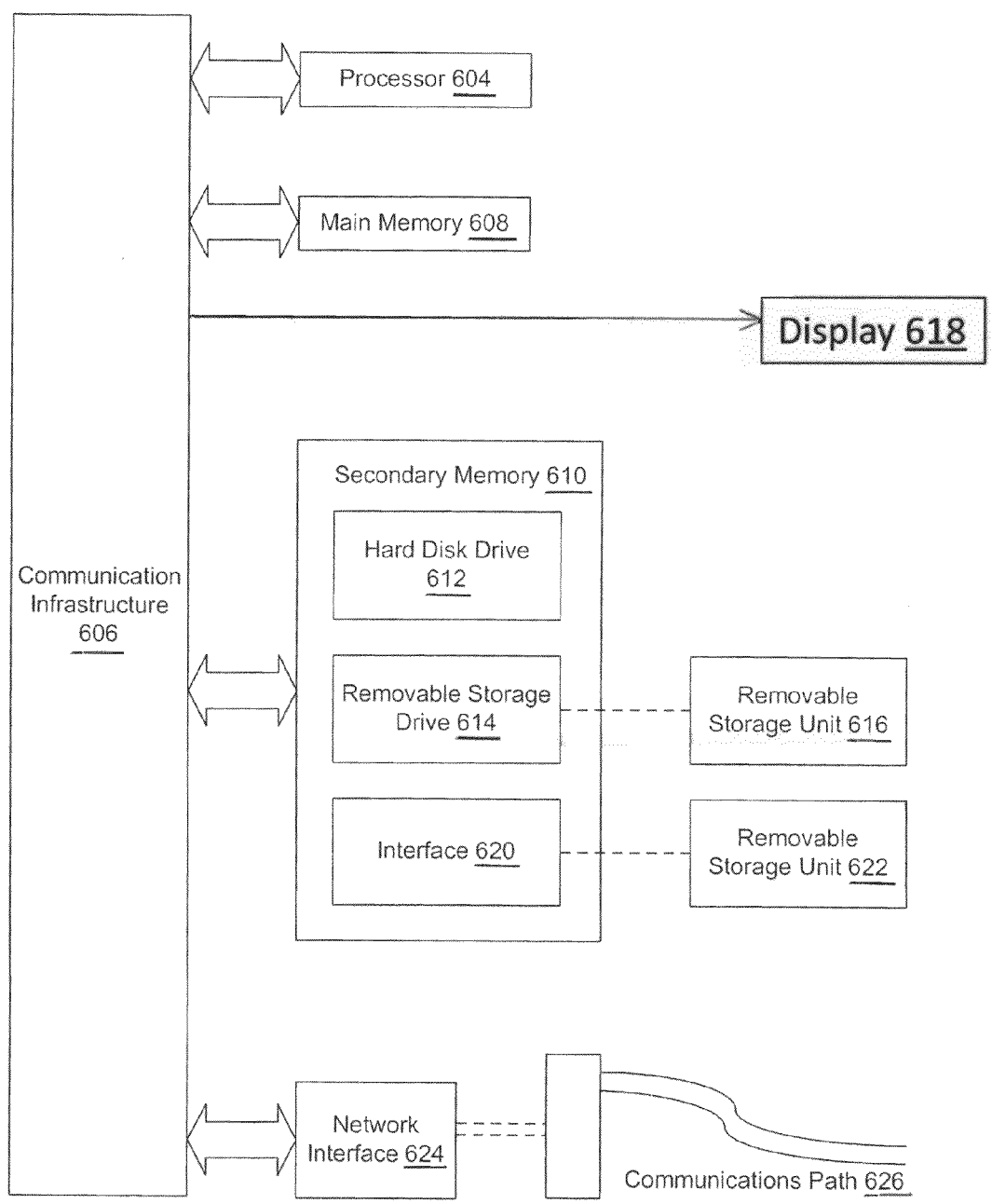
FIG. 6 is an example implementation of a computer system in which example implementations may be implemented.

FIG. 6 illustrates an example computer system 600 in which certain parts of the system 100 may be implemented using computer-readable code. For example, the components or modules of system 100 may be implemented in one or more computer systems 600 using hardware, software, firmware, tangible computer readable media having instructions stored thereon in a non-transitory manner, or a combination thereof. One of ordinary skill in the art will appreciate that implementations of the disclosed subject matter can be practiced with various computer system configurations, including multi-core multiprocessor systems, minicomputers, mainframe computers, computers linked or clustered with distributed functions, as well as miniature computers that may be embedded into any device. A processor device may be a single processor, a plurality of processors, or combinations thereof. Processor devices may have one or more cores.

Although operations may be described as a sequential process, such as the process shown in FIGS. 7A and 7B, some of the operations may in fact be performed in parallel, concurrently and/or in a distributed environment, and with program code stored locally or remotely for access by single or multi-processor machines. In addition, in some implementations, the order of operations may be rearranged without departing from the spirit of the disclosed subject matter.

Processor device 604 may be a special purpose or a general purpose processor device. As will be appreciated by persons skilled in the relevant art, processor device 604 may also be a single processor in a multi-core/multiprocessor system, such system operating alone or in a cluster of computing devices operating in a cluster or server farm. Processor device 604 is connected to a communication infrastructure 606, for example a bus, message queue, network, or multi-core message-passing scheme.

A main memory 608, for example a random access memory and a secondary memory 610 are included in the disclosed system 600. The secondary memory in this example implementation includes a hard disk drive 612 and a removable storage drive 614. The removable storage drive may comprise a floppy disk drive, a magnetic tape drive, a flash memory, or any other suitable memory device known to those of skill in the art. The removable storage drive reads from and/or writes to a removable storage unit 616. The secondary memory 610 may further communicate with a second removable storage unit 622 such as a memory chip by means of an interface 620 to allow computer programs or other instructions to be loaded into the system 600.

A network interface 624 allows software and data to be transferred between the computer system 600 and external devices associated with the network (e.g. network 180). It may include a modem, an interface such as an Ethernet card, a communications port, a PCMCIA slot or other interfaces. Software and data transferred via the network interface 624 may be in the form of signals from a communications path 626. The communications path 626 carries signals and may be implemented using wire or cable, fiber optics, phone lines, RF links or other channels.

Computer programs are stored in the main memory and/or the secondary memory. They may also be received via the network interface 624. Such computer programs, when executed, enable the computer system to implement the processes disclosed herein. In particular, the computer programs enable the processor 604 to implement stages in the methods illustrated in FIGS. 2-5 and 7. When the processes are implemented using software, the software may be stored in a computer program product and loaded into the computer system using removable storage drive 614, interface 620, hard disk drive 612 or the network interface 624. A display 618 allows the user to view reports of analyzed content following the execution of operation 240 or to view operational menus or selected data accessible through the processor 604. Each content source may be comprised of a computer system 600 as described herein. Users 170 also can facilitate their use of the systems described herein by means of the computer system 600.

Furthermore, it should be noted that any of the methods described herein can include an additional operation of providing a system comprising distinct software modules embodied on one or more tangible computer readable storage media. All the modules (or any subset thereof) can be on the same medium, or each can be on a different medium, for example. The modules can include any or all of the components shown in the figures. The method operations can then be carried out using the distinct software modules of the system, as described above, executing on one or more hardware processors.

Further, a computer program product can include a tangible computer-readable recordable storage medium with instructions (e.g., code) adapted to be executed to carry out one or more method operations described herein, including the provision of the system with the distinct software modules. In one or more implementations, secondary memory 610 includes tangible computer-readable recordable storage media and main memory 608 is on and/or accessible to the processor 604; code on one or more tangible computer-readable recordable storage media is loaded into the main memory and configures the processor(s) to implement the techniques described herein.

It should again be emphasized that the above-described implementations are intended to be illustrative only. Other implementations may use different types and arrangements of elements for implementing the described functionality. These alternative implementations within the scope of the appended claims will be apparent to one skilled in the art given the teachings herein. What is more, the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. A method comprising:
providing original content on a content source;
inserting a unique content ID into content information that is associated with the original content when the original content is created, wherein the unique content ID identifies the original content as it is republished, the unique content ID is associated with the original content for the lifetime of the original content;
associating the original content with an author profile;
generating a first hyperlink when the original content is created by an author of the original content that is visible only to the author, and is sent to a traffic clustering engine by a web index when the original content is published;
sending the original content including the unique content ID to a referrer by providing a second hyperlink associated with the original content and the republication of the content, and determining metadata to be included in the second content;
detecting a following of the second hyperlink between the original content and a second content that is a republication of the original content, by another content source, via a content aggregation based on communication with the content source via a web index;
applying a timestamp to the original content, and providing the original content having the timestamp to the web index;
constructing a referring chain, via the traffic clustering engine operatively associated with the web index, by grouping all instances of the republication in the content aggregation that identify the author of the original content in the metadata and the another content source that generated the second content;
providing the referring chain to the web index, wherein the web index performs content matching and date sorting to sort and store the second content; and
in response to an indication of the republication of the original content as the second content, based on the content aggregation and the referring chain, providing a report of the republication to an author of the original content.

2. The method of claim 1, wherein the web index comprises a network that comprises a web crawler, the content aggregation detecting the following of the second hyperlink prior to detection of the original content by the web crawler.

3. The method of claim 1, wherein the unique content ID is inserted into the content information as metadata, and wherein the content aggregation comprises:
aggregating the original content and the second content in association with the unique content ID; and
determining a rate of growth of republication of the original content based on a number of users that viewed the republication of the original content at the content source and the another content source, determining an effect of an event external to the content aggregation on the viewership of the original content and the second content, and determining keywords that increase viewership based on a similarity comparison.

4. The method of claim 3, wherein the unique content ID is inserted into hypertext markup language (HTML) at a website to reference back, such that web statistics can be collected so as to provide a real-time update of the content aggregation to the author.

5. The method of claim 1, wherein the original content cannot be accessed by a user until the providing the original content having the timestamp to the web index is completed.

6. The method of claim 1, wherein an indication of authorship of the original content is provided with a result of a search, and the indication of authorship is associated with the author profile.

7. A system comprising:
a network including interconnected computer networks, one or more content sources, and a web index;
an author profile database including author information communicatively coupled to the network;

a first content source operatively associated with the network and configured to publish first content and to insert a unique content ID and the author information into content information that is associated with the first content when the original content is created, the first content source being further configured to create traffic directed to the first content, wherein the unique content ID identifies the original content as it is republished, and the unique content ID is associated with the original content for the lifetime of the original content and wherein a first hyperlink is generated when the original content is created by an author of the original content that is visible only to the author, and is sent to a traffic clustering engine by a web index when the original content is published, and further wherein the original content including the unique content ID is sent to a referrer by providing a second hyperlink associated with the original content and the republication of the content, and determining metadata to be included in the second content;

a web server operatively associated with the first content source for disseminating content via the network;

a content aggregator configured to detect traffic directed to the first content, to receive content via the network including the first content from the first content source, timestamp the first content, and aggregate content including the unique content ID, and the traffic clustering engine and the web index operatively associated with the content aggregator, wherein the traffic clustering engine constructs a referring chain, via the traffic clustering engine operatively associated with the web index, by grouping all instances of the republication in the content aggregation that identify the author of the original content in the metadata and the another content source that generated the second content, and provides the referring chain to the web index, wherein the web index performs content matching and date sorting to sort and store the second content;

wherein in response to an indication of the republication of the original content as the second content, based on the content aggregated by the content aggregator and the referring chain generated by the traffic clustering engine, providing a report of the republication to an author of the original content.

8. The system of claim 7, wherein the network comprises a web crawler, the content aggregator configured to detect following of the second hyperlink prior to detection of the first content by the web crawler.

9. The system of claim 7, wherein the unique content ID is inserted into the content information as metadata, and wherein the content aggregator aggregates the original content and the second content in association with the unique content ID, and determines a rate of growth of republication of the original content based on a number of users that viewed the republication of the original content at the content source and the another content source, an effect of an event external to the content aggregation on the viewership of the original content and the second content, and keywords that increase viewership based on a similarity comparison.

10. The system of claim 9, wherein the unique content ID is inserted into hypertext markup language (HTML) at a website to reference back, such that web statistics can be collected so as to provide a real-time update of the content aggregation to the author.

11. The system of claim 7, wherein the first content cannot be accessed by a user until the web index has received the first content having the timestamped first content.

12. The system of claim 7, wherein an indication of authorship of the first content is provided with a result of a search, and the indication of authorship is associated with the author profile.

13. A non-transitory computer readable medium having executable instructions, the instructions comprising:

providing original content on a content source;

inserting a unique content ID into content information that is associated with the original content when the original content is created, wherein the unique content ID identifies the original content as it is republished, the unique content ID is associated with the original content for the lifetime of the original content;

associating the original content with an author profile;

generating a first hyperlink when the original content is created by an author of the original content that is visible only to the author, and is sent to a traffic clustering engine by a web index when the original content is published;

sending the original content including the unique content ID to a referrer by providing a second hyperlink associated with the original content and the republication of the content, and determining metadata to be included in the second content;

detecting a following of the second hyperlink between the original content and a second content that is a republication of the original content, by another content source, via a content aggregation based on communication with the content source via a web index;

applying a timestamp to the original content, and providing the original content having the timestamp to the web index;

constructing a referring chain, via the traffic clustering engine operatively associated with the web index, by grouping all instances of the republication in the content aggregation that identify the author of the original content in the metadata and the another content source that generated the second content;

providing the referring chain to the web index, wherein the web index performs content matching and date sorting to sort and store the second content; and in response to an indication of the republication of the original content as the second content, based on the content aggregation and the referring chain, providing a report of the republication to an author of the original content.

14. The non-transitory computer readable medium of claim 13, wherein the web index comprises a network that comprises a web crawler, the content aggregation detecting the following of the second hyperlink prior to detection of the original content by the web crawler.

15. The non-transitory computer readable medium of claim 13, wherein the unique content ID is inserted into the content information as metadata, and wherein the content aggregation comprises:

aggregating the original content and the second content in association with the unique content ID; and determining a rate of growth of republication of the original content based on a number of users that viewed the republication of the original content at the content source and the another content source, determining an effect of an event external to the content aggregation on the viewership of the original content and the second content, and determining keywords that increase viewership based on a similarity comparison.

16. The non-transitory computer readable medium of claim 13, wherein the original content cannot be accessed by a user until the providing the original content having the timestamp to the web index is completed.

17. The non-transitory computer readable medium of claim 13, wherein an indication of authorship of the original content is provided with a result of a search, and the indication of authorship is associated with the author profile.

* * * * *